Oct. 28, 1969    R. A. SCOTT    3,474,840
ADAPTER FOR USE WITH TIRE CHANGING STANDS
Filed June 12, 1967    3 Sheets-Sheet 1
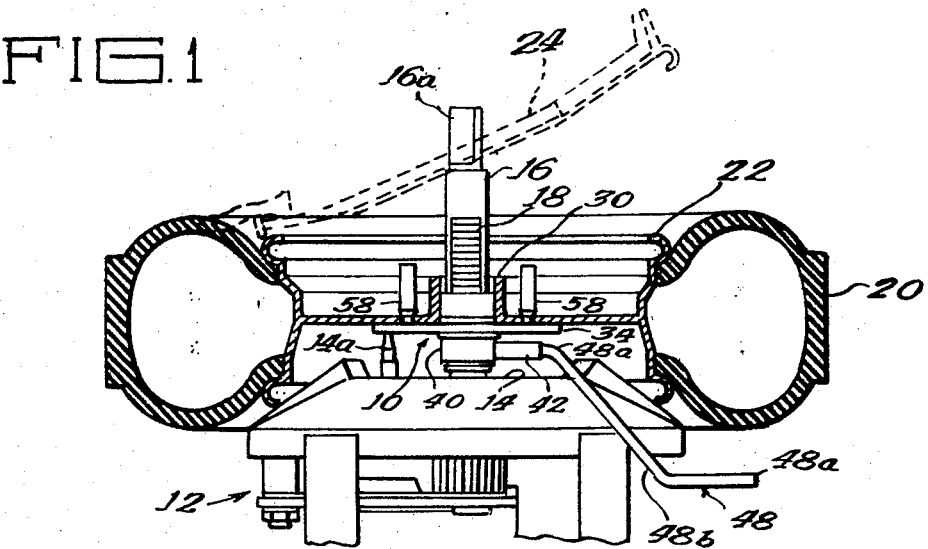
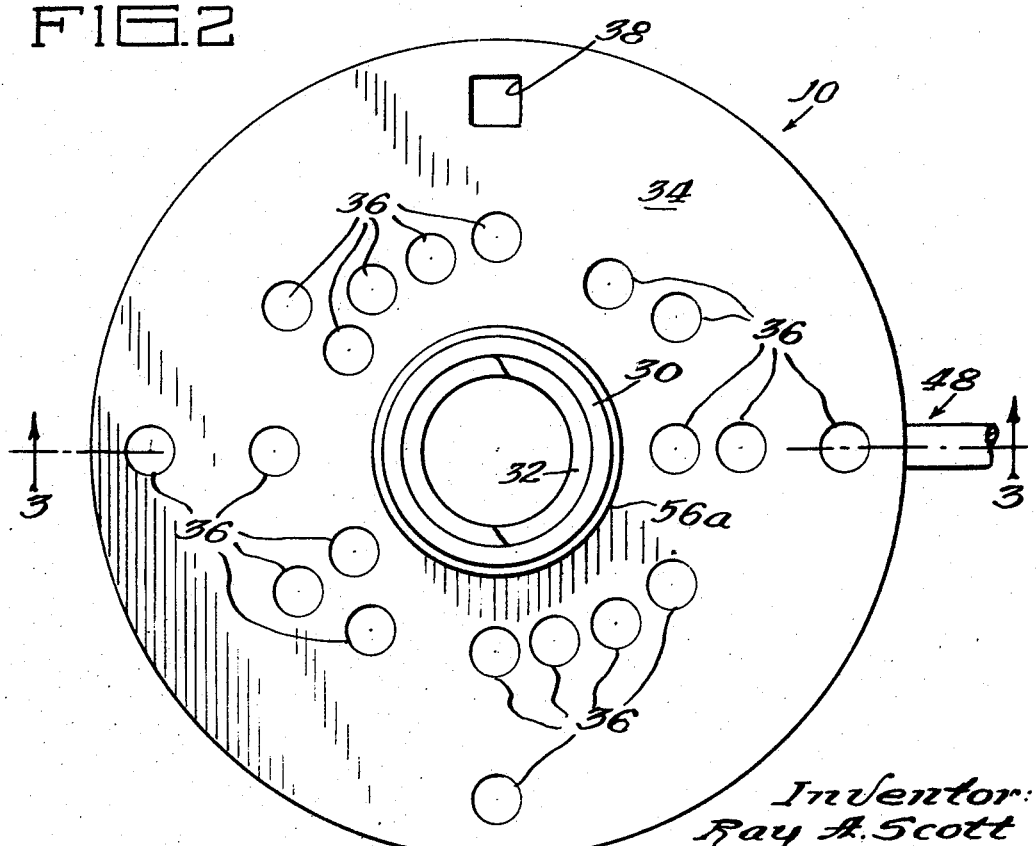
Inventor:
Ray A. Scott
By: Hofgren, Wegner,
Allen, Stellman & McCord
Attorneys Oct. 28, 1969   R. A. SCOTT   3,474,840
ADAPTER FOR USE WITH TIRE CHANGING STANDS
Filed June 12, 1967   3 Sheets-Sheet 2
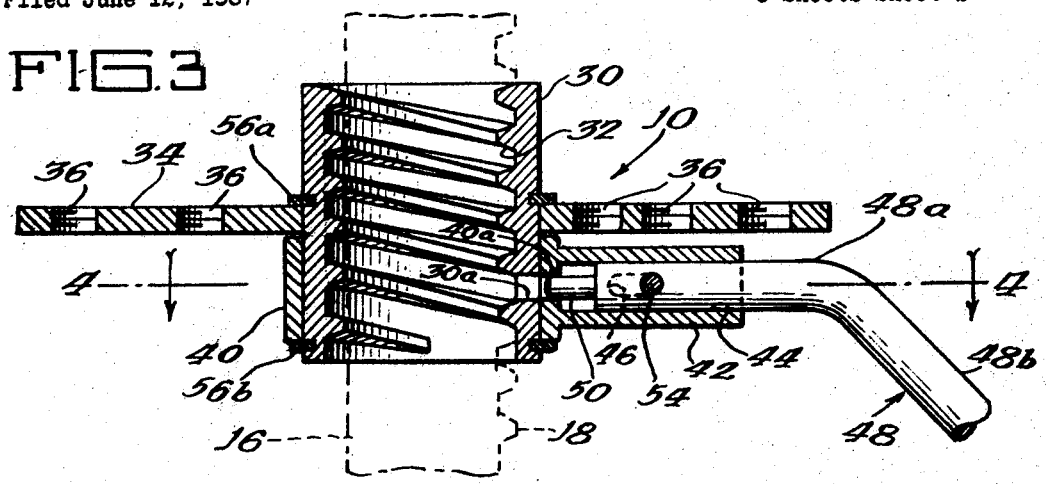
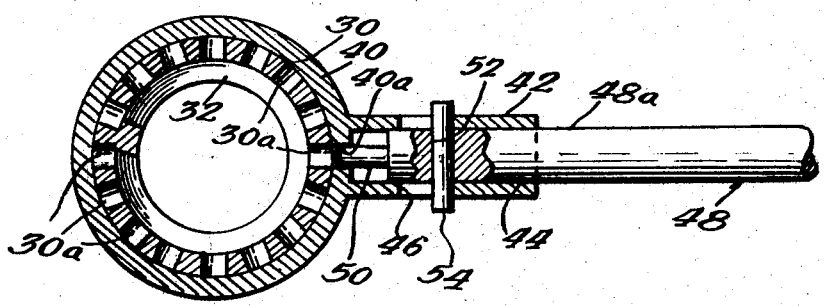
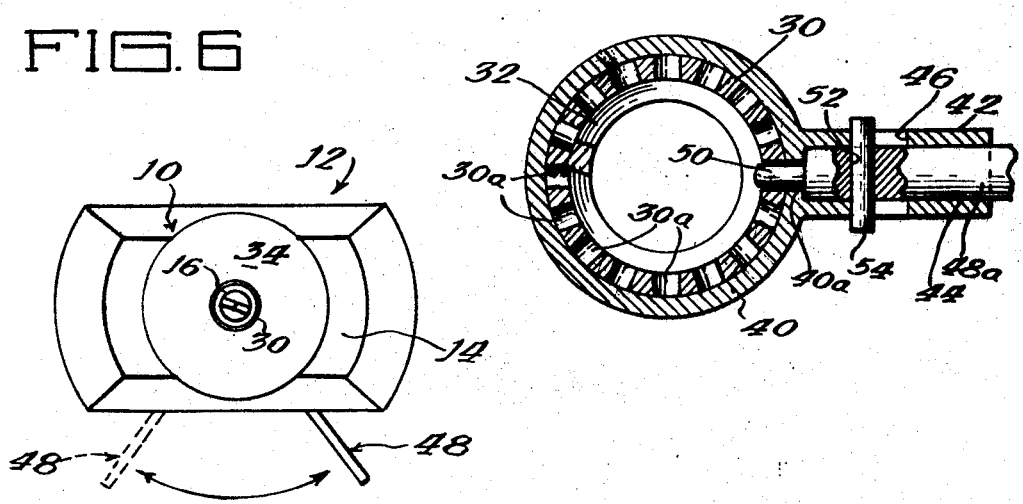

Oct. 28, 1969 R. A. SCOTT 3,474,840
ADAPTER FOR USE WITH TIRE CHANGING STANDS
Filed June 12, 1967 3 Sheets-Sheet 3

United States Patent Office 3,474,840
Patented Oct. 28, 1969

3,474,840
ADAPTER FOR USE WITH TIRE CHANGING STANDS
Ray A. Scott, Fort Dodge, Iowa, assignor to The Coats Company, Inc., a corporation of Iowa
Filed June 12, 1967, Ser. No. 645,282
Int. Cl. B60c 25/06
U.S. Cl. 144—288     6 Claims

ABSTRACT OF THE DISCLOSURE

An adapter for mounting soft metal or decorative vehicle rims on a tire changing stand having an upstanding post projecting from the tire supporting table comprising a member having a hub portion for engagement with the post and portions extending outwardly from the hub having threaded openings for receiving the reduced threaded ends of bolts which are adapted to extend through bolt openings of a rim to fix the rim to the stand.

BACKGROUND OF THE INVENTION

Field of the invention

This application relates to tire changing equipment and more particularly to an adapter for securing a vehicle rim to a tire changing stand without marring or gouging the rim.

Description of the prior art

In tire changing stands having an upstanding center post, the common means for securing a vehicle rim to the stand has been by the use of a clamping member having a threaded interior for engagement with the threaded exterior portion of the post and a frusto-conical exterior for extending into the central opening of the rim. The rim is placed on the top of the stand, and the clamping member is threaded down on the post until the tapering side walls of the frusto-conical clamp snugly engage the central opening of the vehicle rim and force the rim against the top of the stand. Such a construction is shown in Coats Patent No. 2,895,519 which is owned by the assignee of the instant application.

In recent years, vehicle rims of a decorative nature, made of either magnesium or aluminum, have become commonplace, especially for the sports car fan. Because these rims are decorative and made of relatively soft metal, care must be taken to prevent abuse and gouging of these rims during the tire changing process. Use of the frusto-conical clamping member as shown in Coats Patent No. 2,895,519 may score or otherwise damage the area adjacent the central opening of decorative or soft metal rims. This invention is directed to an improved means for securing the rim to the stand so that such damage will not occur.

SUMMARY OF THE INVENTION

This invention is directed, in brief, to the provision of an adapter for use with a tire changing stand which has first portions for securement to a vehicle rim and second portions for securement to the center post of a tire changing stand for fastening the rim to the post without direct engagement between the rim and post and further without marring, gouging or otherwise abusing the decorative exterior of the rim. In particular, the adapter member has a hub portion which is internally threaded and a plate portion which has a plurality of positioning holes. The adapter may be threaded on the center post of a tire changing stand and a vehicle rim placed on the plate portion with the openings in the rim aligned with openings in the plate. Lug bolts may be utilized to secure the rim to the plate, and the threaded engagement between the hub portion and the post affixes the rim to the tire changing stand.

BRIEF DESCRIPTION OF THE DRAWINGS

FIGURE 1 is a fragmentary sectional view showing a tire changing stand, with a vehicle rim and associated tire mounted on the stand by means of the adapter of this invention;

FIGURE 2 is a top plan view of the adapter of this invention;

FIGURE 3 is a sectional view taken generally along the lines 3—3 of FIGURE 2;

FIGURE 4 is a frgamentary sectional view taken generally along the lines 4—4 of FIGURE 3 showing the handle disengaged with respect to the hub portion;

FIGURE 5 is a section view similar to FIGURE 4 showing the handle engaging the hub portion;

FIGURE 6 is a diagrammatic view in top plan showing the operation of the adapter for mounting the same to the top of the tire changing stand;

DESCRIPTION OF THE PREFERRED EMBODIMENTS

Figure 8:
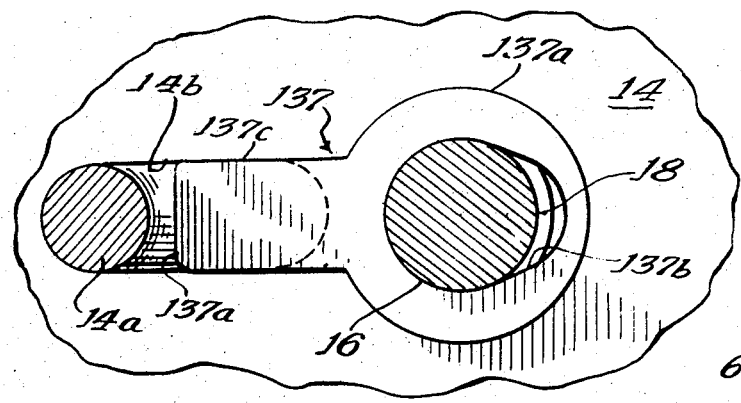
FIGURE 8 is a fragmenary sectional view taken generally along the lines 8—8 of FIGURE 7.
Figure 9:
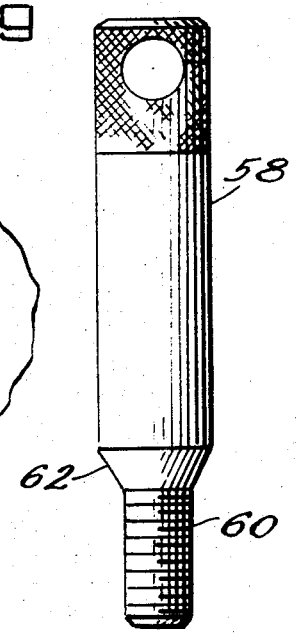
FIGURE 9 is a view of the bolts used with the adapter of this invention.

Adapter 10 of this invention is shown in use with a tire changing stand 12 of the type described and claimed in Strang Patent No. 3,255,800. Generally, the tire changer 12 includes a supporting surface 14 having a positioning pin 14a protruding upwardly therefrom and adapted for lateral movement in a slot 14b (FIG. 8). A column 16 extends upwardly from the central portion of the supporting surface 14 and includes a rotatable tire tool driving shaft 16a having a tool driving extension 16b at its free end. The lower portion of the column 16 is exteriorly threaded as at 18. In use, a tire 20 may be mounted or demounted with respect to a vehicle rim 22 through the aid of a tire tool 24 of the type shown and claimed in Strang Patent No. 3,247,883 by means of the operation of the stand 12. This invention is directed to an improved means for holding the rim 22 on the stand during the tire changing operation, which means will maintain exposed surfaces of the rim 22 free from marring, gouging or other abuse.

With particular reference to FIGURES 2 through 5, the adapter 10 includes a central hub portion 30 having a plurality of spaced openings 30a. The interior 32 of the hub is threaded for engagement with the threaded exterior 18 of the column 16. Connected to the hub is a plate 34 which serves as a radially outwardly extending surface. The plate has a plurality of threaded openings 36. The openings 36 are positioned so that three lug bolts will be able to be inserted through similar openings or spaces in most known rims of current commercial manufacture to provide a means for connecting any rim to the member. Also, a positioning pin hole 38 is provided for receiving the free end of the positioning pin which serves to stabilize the position of the member 10 with respect to the tire changing stand.

The lower end of the hub 30 is surrounded by a guide ring 40 which has an opening 40a. Guide ring 40 includes an outwardly projecting sleeve 42 having a hollow interior 44 with slots 46 in the side walls of the sleeve.

A handle 48, including a first portion 48a, and intermediate portion 48b and a free end 48c, is received in the sleeve 42 of ring 40 and has a reduced end 50 of a size and shape to fit within the openings 30a and 40a in the hub and rings 30 and 40, respectively. In addition, the handle has an opening 52 to receive a pin 54 which projects beyond the slots 46 in the sleeve 42 so that the handle is mounted for to and fro or in and out movement with respect to the sleeve 42 and, therefore, with respect to the hub portion 30. The width of the slots 46 is such that, in combination with the dimension of reduced end 50, the pin 54 and slots 46 provide a means for limiting both the rearward retraction and the forward extension of the reduced end 50 with respect to openings 30a and 40a. Snap rings 56a and 56b connect the plate 34, the ring 40 and hub 30 together as a unit.

In operation, the member 10 is first telescoped over the column 16 of the tire changing stand with the positioning pin 14a engaging opening 38 and then a vehicle rim 22 is placed thereover. Lug bolts 58 having reduced threaded ends 60 which threadably engage with openings 36 are inserted through openings in the rim which are aligned with selected openings 36 in plate 34. Tapered portion 62 of bolts 60 wedge in the bolt holes of rim 22 as the bolts are threaded into openings 36 to secure the rim to plate 34. When the bolts 58 are tightened, the rim is fastened to the plate portion 34 of the member 10. The adapter 10 is then fastened down the column 16 by the action illustrated diagrammatically in FIGURE 6 with the aid of the relative movement shown in FIGURES 4 and 5. The handle is swung arcuately to and fro as indicated in FIGURE 6 while alternately withdrawing the end 50 of the handle from one of the openings 30a and reinserting the same and reversing the direction of movement of the handle. In other words, the handle is pushed inwardly with respect to sleeve 42 so that reduced end 50 engages an opening 30a. The handle is then swung to the left as viewed in FIGURE 6, moved rearwardly in sleeve 42 to withdraw the end 50 from one of the openings 30a, and then returned to the right as viewed in FIGURE 6 and the cycle repeated until such a time as the member 10 and rim 22 are threaded down on the top 14 of the tire changer 12 as far as the positioning pin 14a will permit. Once this is done, the demounting or mounting operation may take place in the usual fashion.

Figure 7:
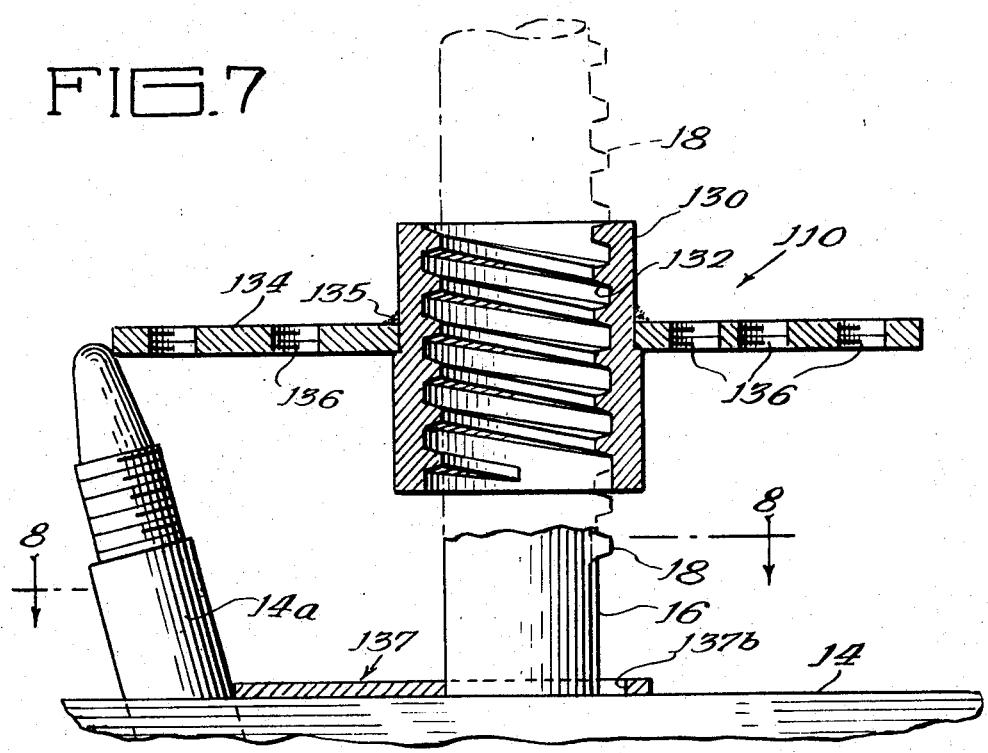
FIGURE 7 is an enlarged fragmentary broken sectional view similar to FIGURE 3 of a modified form of the adapter.

A modified version of the invention is shown in FIGURES 7 and 8. Here the adapter 110 includes a hub 130 which has a threaded interior 132 of a size to engage the threaded portion 18 of the center column 16. A plate 134 is affixed to the hub by means, such as welding at 135. Plate 134 is generally the same as plate 34 and includes the threaded openings 136 for receiving the threaded ends 60 of lug bolts 58. With the adapter 110, a positioning pin locator 137 is utilized. The locator 137 is a member having an enlarged portion 137a with an oval interior 137b generally of a size and shape to embrace the center column 16 and extend beyond the threaded portion 18 so that the locator 137 may merely be telescoped over column 16 and dropped onto the top of the supporting surface 14. The locator further includes an outwardly projecting finger 137c having an end portion 137d which abuts the positioning pin 14a and moves it laterally in the slot in table 14 so that it will be positioned beyond the periphery of the plate 134.

In operation, adapter 110 is first threaded down on the column 16 after the locator 137 has been inserted to push the positioning pin 14a laterally outwardly from the periphery of the plate 134. Then the rim is placed on top of the plate 134 and the lug bolts 58 are threaded through the rim openings into certain holes 136 which are aligned with the openings in the rim to affix the rim to the plate and, therefore, to the tire changing stand.

The adapter of this invention provides a means for mounting rims to tire changing stands of the type having an upstanding center post in a manner which eliminates possible gouging or marring of the surfaces of the rim. The operation of the device is simple so that it may be quickly assembled on the tire changing stand. Moreover, no modification of the tire changing stand is necessary in order to receive the adapter.

The foregoing detailed description has been given for clearness of understanding only, and no unnecessary limitations should be understood therefrom, as some modifications may be obvious to those skilled in the art.

I claim:

1. In combination with a tire changing stand having a rim supporting surface, a center column projecting upwardly therefrom and having a threaded exterior portion, a rim mounting adapter for mounting a vehicle rim on the stand, comprising: a first portion having a threaded interior for threadable engagement to the center column for movement relative thereto, said first portion including a member engageable therewith by means of a lost motion connection for rotating the first portion relative to the column; a second portion connected to the first portion having a first fastening means thereon arranged to be in alignment with openings in a vehicle rim juxtaposed thereover; and second fastening means engageable with said first fastening means and constructed and arranged to hold a rim therebetween when so engaged; whereby a vehicle rim having a central opening may be mounted about the column on the tire changing stand by fastening the same to the second portion and moving the first portion relative to the center column to connect the same thereto.

2. The combination of claim 1 wherein the hub is provided with a ring having a handle movably mounted relative to the ring between a hub engaging position, whereby the hub may be rotatably driven relative to the column, and a disengaged position wherein the handle and sleeve are free to rotate relative to the hub without moving the hub relative to the column.

3. The combination of claim 2 wherein the handle is mounted in a sleeve connected to the ring for reciprocal movement between the said hub engaging and disengaged positions.

4. A rim mounting adapter for mounting a vehicle rim on a tire changing stand having a threaded central column projecting upwardly from a rim supporting surface, comprising: a first portion having a threaded interior for threadable engagement to the center column for movement relative thereto, said first portion including a member engageable therewith by means of a lost motion connection for rotating the first portion relative to the column; a second portion connected to the first portion having a first fastening means thereon arranged to be in alignment with openings in a vehicle rim juxtaposed thereover; and second fastening means engageable with said first fastening means and constructed and arranged to hold a rim therebetween when so engaged; whereby a vehicle rim having a central opening may be mounted about the column on the tire changing stand by fastening the same to the second portion and moving the first portion relative to the center column to connect the same thereto.

5. The rim mounting adapter of claim 4 wherein the hub is provided with a ring having a handle movably mounted relative to the ring between a hub engaging position, whereby the hub may be rotatably driven relative to the column, and a disengaged position wherein the handle and sleeve are free to rotate relative to the hub without moving the hub relative to the column.

6. The rim mounting adapter of claim 5 wherein the handle is mounted in a sleeve connected to the ring for reciprocal movement between the said hub engaging and disengaged positions.

References Cited

UNITED STATES PATENTS 2,136,633 11/1938 Morse _____ 73—482
2,895,519 7/1959 Coats _____ 144—288.1

ANDREW R. JUHASZ, Primary Examiner
G. WEIDENFELD, Assistant Examiner

U.S. Cl. X.R.

73—482; 157—1.24